US012191669B2

(12) United States Patent
Sadan et al.

(10) Patent No.: US 12,191,669 B2
(45) Date of Patent: Jan. 7, 2025

(54) DISTRIBUTED ENERGY RESOURCES COMMUNICATIONS NETWORK AND CONTROL SYSTEM

(71) Applicant: GridEdge Networks, Inc., Acton, MA (US)

(72) Inventors: Nachum Sadan, Carlisle, MA (US); Bruce Renz, Columbus, OH (US)

(73) Assignee: GRIDEDGE NETWORKS, INC., Acton, MA (US)

( * ) Notice: Subject to any disclaimer, the term of this patent is extended or adjusted under 35 U.S.C. 154(b) by 510 days.

(21) Appl. No.: 17/488,550

(22) Filed: Sep. 29, 2021

(65) Prior Publication Data
US 2022/0102982 A1 Mar. 31, 2022

Related U.S. Application Data

(60) Provisional application No. 63/084,784, filed on Sep. 29, 2020.

(51) Int. Cl.
*H02J 3/38* (2006.01)
*H02J 3/46* (2006.01)
*H04B 3/20* (2006.01)

(52) U.S. Cl.
CPC .............. *H02J 3/381* (2013.01); *H02J 3/466* (2020.01); *H04B 3/20* (2013.01); *H02J 2203/10* (2020.01)

(58) Field of Classification Search
CPC ........ H02J 3/381; H02J 3/466; H02J 2203/10; H04B 3/20; Y04S 10/12; Y04S 10/16; Y04S 40/00–18
See application file for complete search history.

(56) References Cited

U.S. PATENT DOCUMENTS

2011/0106321 A1* 5/2011 Cherian ............ H02J 13/00034
700/286
2012/0029897 A1* 2/2012 Cherian ............ H02J 13/00028
703/18
(Continued)

OTHER PUBLICATIONS

IEEE, "IEEE Standard for Interconnection and Interoperability of Distributed Energy Resources with Associated Electric Power Systems Interfaces", (Apr. 6, 2018), p. 1-136 (Year: 2018).*
(Continued)

*Primary Examiner* — Mong-Shune Chung
(74) *Attorney, Agent, or Firm* — Ware, Fressola, Maguire & Barber LLP

(57) ABSTRACT

A method and system are provided for a distributed communications and control network that manages Distributed Energy Resources ("DER") on a power utility grid. An integrated network and system uses a hub and spoke, substation-centric network architecture, and comprises: a plurality of edge DER ("E-DERM") devices, each E-DERM device located at a DER point of interconnection; a single substation DER controller ("D-DERM") located at a utility substation and configured to manage the plurality of E-DERM devices; integrated point-to-point secured communications between the D-DERM and each of the plurality of E-DERM devices using dual-channel, redundant paths; and closed-loop control software algorithms running autonomously on the D-DERM at the utility substation to monitor and control DER connected to power lines emanating from the utility substation.

20 Claims, 3 Drawing Sheets

(56) References Cited

U.S. PATENT DOCUMENTS

| | | | | |
|---|---|---|---|---|
| 2012/0143385 A1* | 6/2012 | Goldsmith | .............. | H02J 3/466 |
| | | | | 700/297 |
| 2012/0310423 A1* | 12/2012 | Taft | .................. | H02J 13/00006 |
| | | | | 700/286 |
| 2014/0070617 A1* | 3/2014 | Detmers | ............... | H02J 7/0071 |
| | | | | 307/64 |
| 2015/0081126 A1* | 3/2015 | Sadan | .................... | H04B 3/546 |
| | | | | 700/292 |
| 2019/0267804 A1* | 8/2019 | Matan | ....................... | H02J 3/01 |

OTHER PUBLICATIONS

IEEE, "IEEE Standard Conformance Test Procedures for Equipment Interconnecting Distributed Energy Resources with Electric Power Systems and Associated Interfaces", (May 21, 2020), p. 1-281 (Year: 2020).*

* cited by examiner

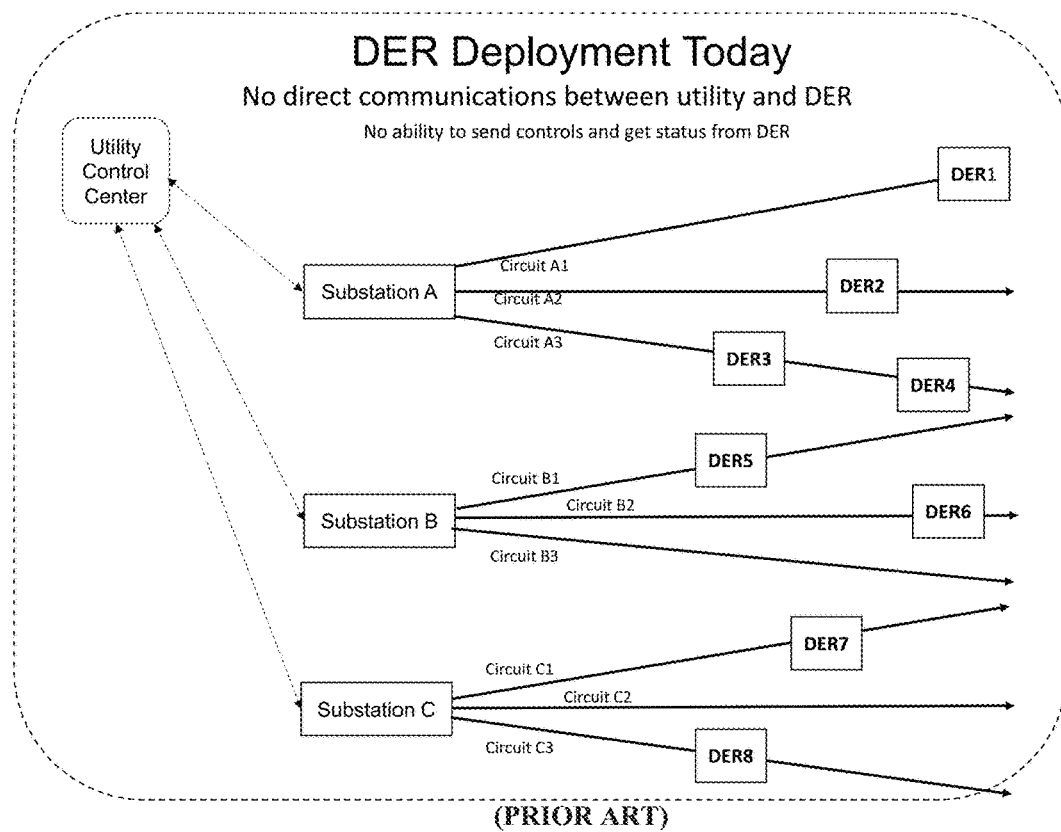
Figure 1: A power grid section with DER deployments today
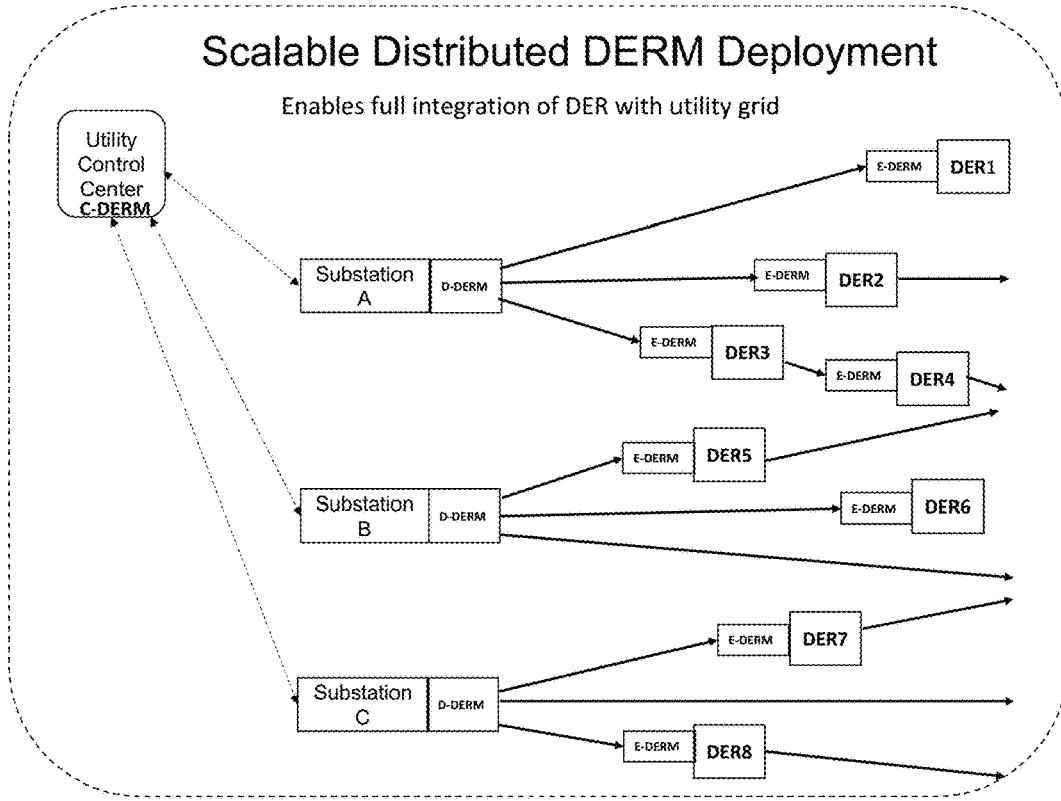
Figure 2: DERCOM enables full DER integration

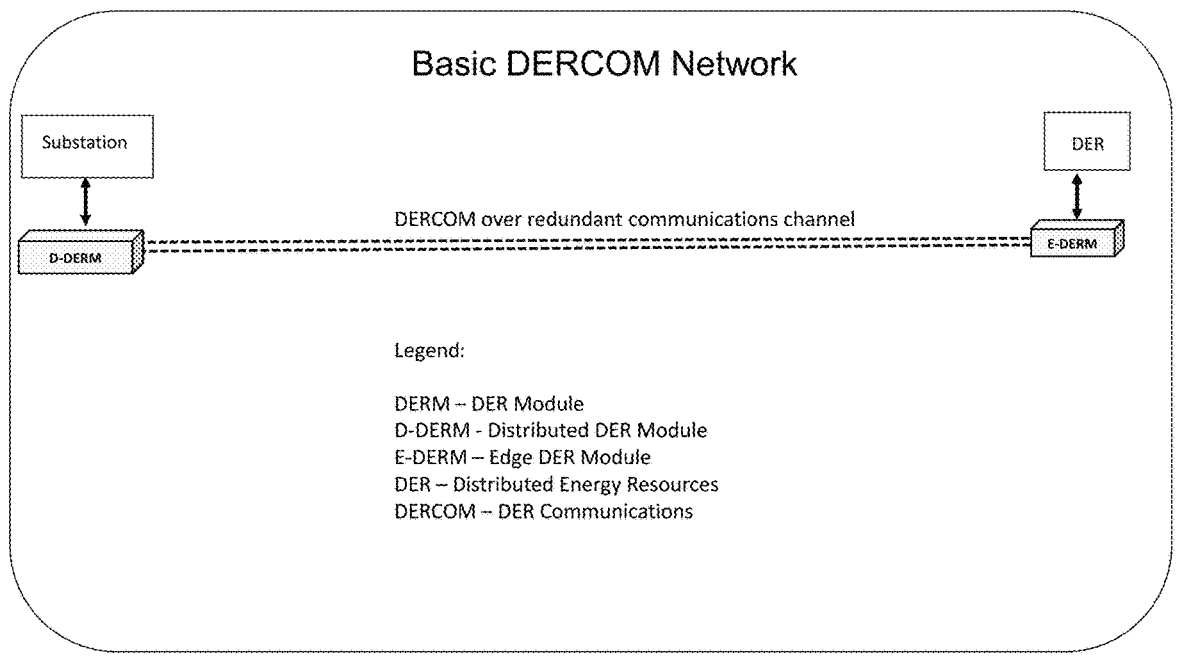
Figure 3: Basic DERCOM network deployment
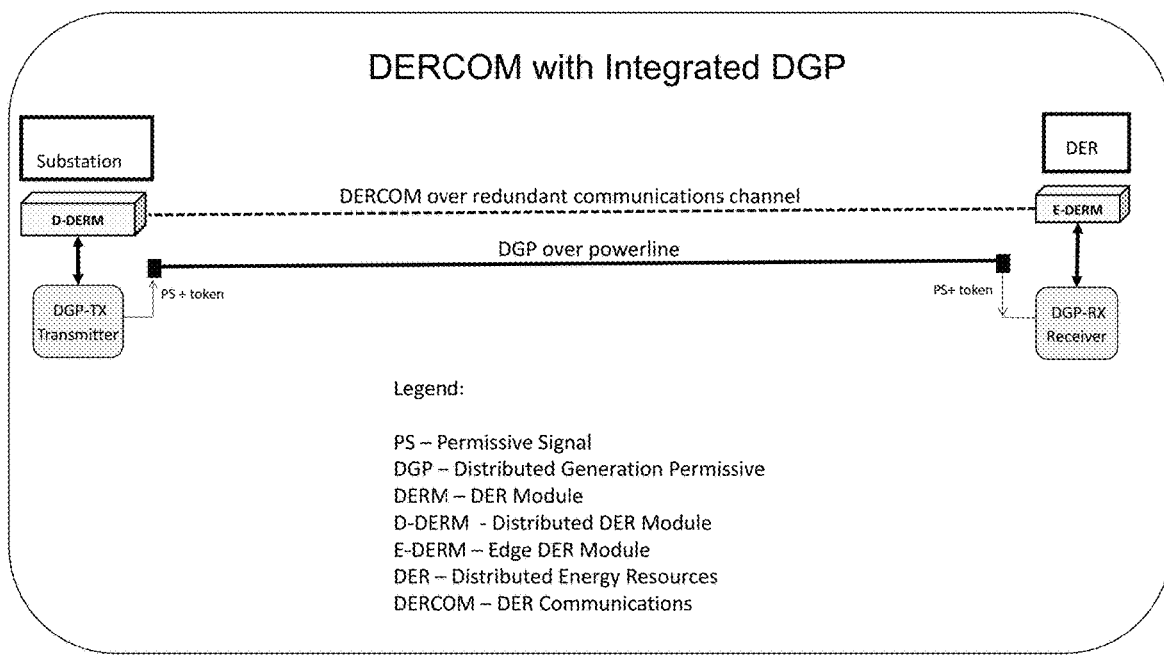
Figure 4: DERCOM with integrated DGP deployment

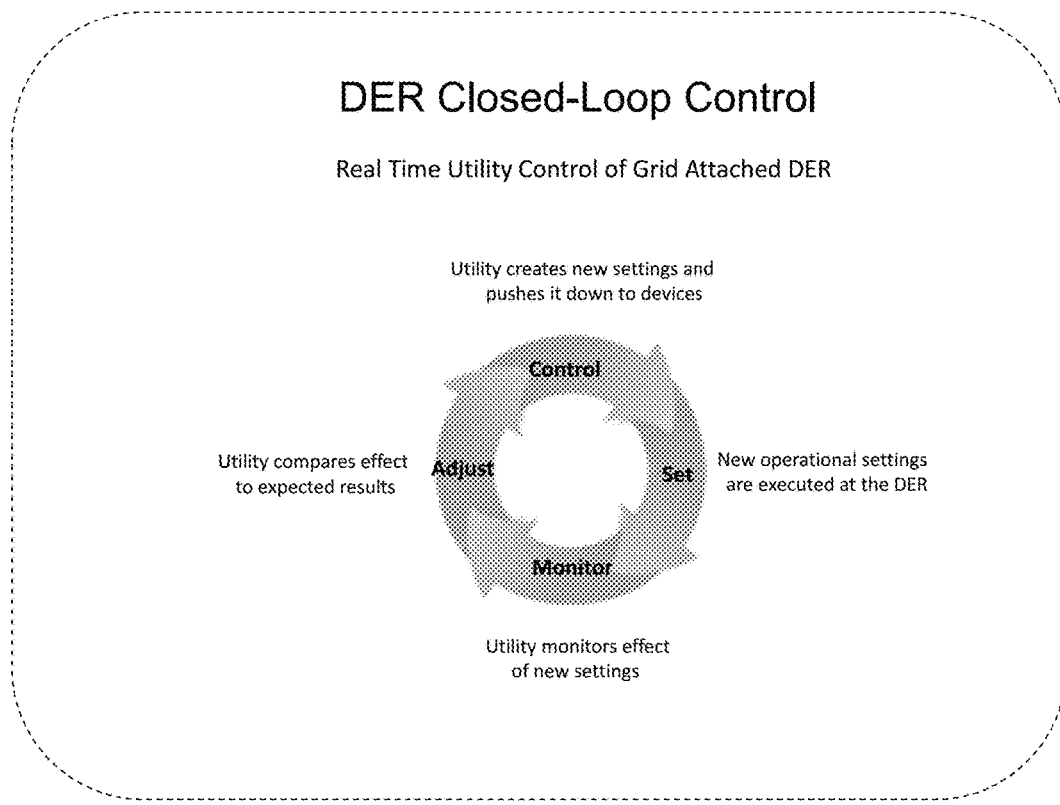
Figure 5: Closed-loop control algorithm implemented in DERCOM
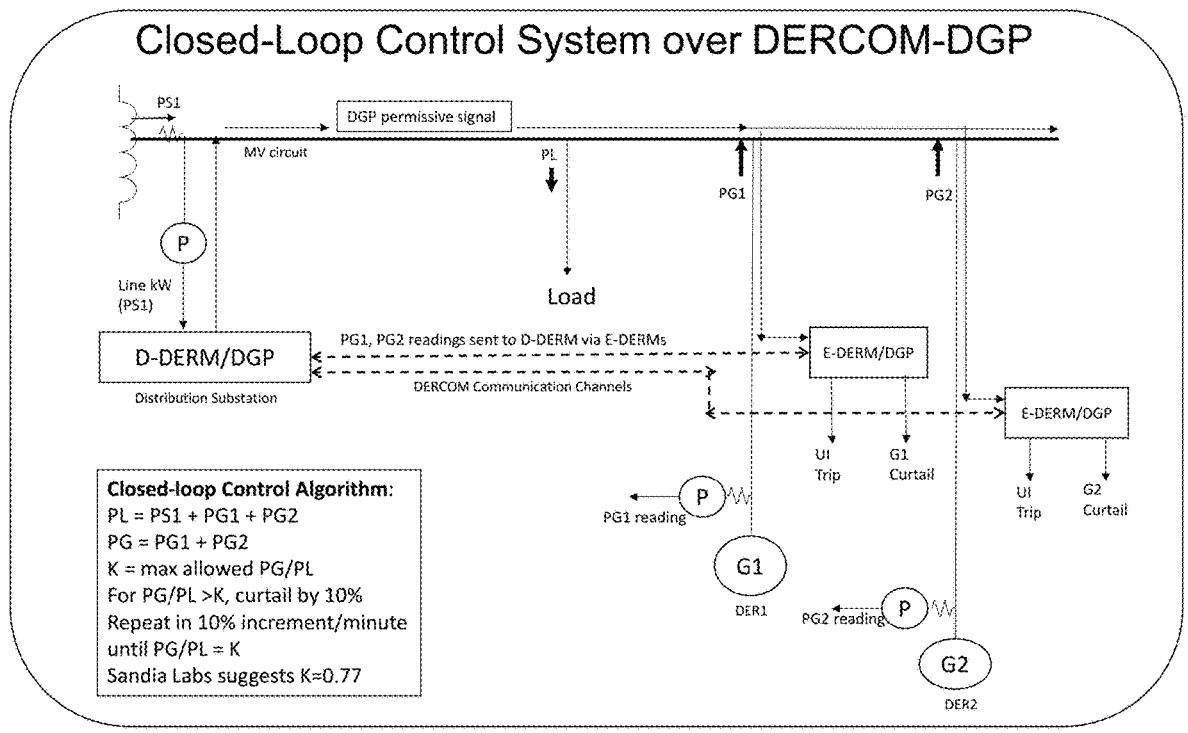
Figure 6: A closed-loop control system over a DERCOM-DGP network

DISTRIBUTED ENERGY RESOURCES COMMUNICATIONS NETWORK AND CONTROL SYSTEM

TECHNICAL FIELD

The present invention relates to the interconnection of Distributed Energy Resources (DER) with the power grid system. DER includes Distributed Generation (DG) and Energy Storage Systems (ESS). IEEE 1547-2018 is the industry standard for "Interconnection and Interoperability of Distributed Energy Resources with Associated Electric Power Systems Interfaces". IEEE 1547.1-2020 is the industry standard of "Conformance Test Procedures for Equipment Interconnecting Distributed Energy Resources with Electric Power Systems and Associated Interfaces". The two IEEE standards define advanced functions and three approved communication protocols that DER is required to support if they wish to connect to the grid and export power.

Distributed Energy Resources have been broadly deployed on the grid system since the early 2000's. As the utility industry moves from a simple interconnection of DER for the export of power (KW), to a more sophisticated and closer integration with the power grid, a secure and reliable communications capability is required to deliver control signals that enable new intelligent grid support functions. The IEEE 1547-2018 standard mandates that DER support at least one (of three approved) communications protocol for that purpose.

BACKGROUND OF THE INVENTION

DER Management Systems (DERMS) have been developed over the past seven years to meet this challenge. DERMS use a centralized software platform that is typically deployed at the utility control center. It often uses the utility's existing communications network to connect with the DER. A Remote Terminal Unit (RTU) is usually placed in front of the DER to provide protocol conversion and media adaptation. Present day DERMS solutions may use proprietary implementations that are not conforming to the newly published IEEE 1547.1-2020 standard that defines the interconnection control parameters.

This invention takes a different approach than the traditional centralized DERMS method. It uses a distributed architecture that has a number of added benefits.

Cost-Effective
  Can be deployed in stages, delaying non-urgent investments
    Deployed on circuits that need it most, using selective deployment criteria
    Reduces need for a costly up-front investment in a comprehensive centralized system
Fast and Simple to Deploy
  Minimizes risk by starting small with a distributed edge system and growing from there
    Deploys quickly on high DER penetration circuits and DER saturated substations
    Can delay need to spend time on integration and training of a complex centralized DERMS system
Scalable
  Reduces communications requirements (bandwidth, latency, speed) between distributed DER and utility control center
    A distributed DERM system frees up grid network resources for other utility applications such as SCADA communications and data transfer.
  Places computing power closest to application site
    Decision-making at the edge reduces need for computing power at the center
    Allows controlled growth by the utility across multiple circuits and substations
      Can be deployed in stages, with first priority given to circuits where it is needed most
      Can be integrated seamlessly with a centralized management system when appropriate
Secure
  The present invention (named DERCOM) has a distributed communications network that is simpler and therefore inherently more cyber-secure.
  Integrated Powerline Communications (PLC) offers added cyber-security when sending critical messages
DERCOM provides the four fundamental roles of a DERM system:
1. Aggregate: Aggregates the services of many individual DER and presents them as a smaller, more manageable, number of aggregated virtual resources
2. Simplify: Handles the granular details of DER settings and presents simple grid-related services
3. Optimize: Optimizes the utilization of DER within various groups to get the desired outcome at minimal cost and maximum power quality
4) Translate: Translates individual DER languages, and presents to the upstream calling entity in a cohesive way.

SUMMARY OF THE INVENTION

This invention, named DERCOM, is a new method and system for a distributed communications network and control system for integrating DER with the utility power grid, The DERCOM network and system architecture includes three levels:
E-DERM: An Edge DERM device deployed at each DER location, acting as a communications gateway and protocol translator between the D-DERM and DER. The E-DERM can also act as a communications gateway and protocol translator between the D-DERM and other utility devices (e.g. capacitor banks, voltage regulators, meters, etc.) installed on the distribution grid, as well as with controllable loads fed from the grid.
D-DERM: A Distributed DERM controller deployed at a utility substation, capable of hosting multiple algorithms for managing dozens of DER devices that are deployed on circuits emanating from that utility substation. D-DERM communicates directly with one or many E-DERM.
C-DERM: A Centralized DERM software application, typically deployed at the utility data center, with sufficient computing power and communications capability to handle thousands of DER devices. The C-DERM is optional and may not be required for many small and mid-size local DER applications. C-DERM communicates directly with one or many D-DERM.

The DERCOM network solution provides the ability to continuously monitor and manage DER assets. For example, if a DER asset is causing a circuit voltage rise that is exceeding limits, DERCOM can initiate commands (e.g. absorb VARs or change generation production) to limit the rise. For both thermal and voltage limited circuits, and where either limit is expected to be reached only occasionally, DERCOM can increase hosting capacity by acting on the DER assets during the hours of need. Similarly, if a DER is causing a distribution asset to exceed its thermal limit, DERCOM can take action upon the DER, remediating the thermal issue. Additionally, DERCOM can detect unintentional islanding (UI) and quickly remove the DER from service.

One of the main points for DER developers/installers is the potential for unexpected interconnection costs. Although each DER developer's business case is unique, under certain scenarios DERCOM can be a least cost interconnection alternative, while only minimally impacting the DER owner's revenue stream.

Additional benefits can accrue to all parties as DERCOM provides improved grid performance such as better power quality and reduced system losses.

DERCOM is the first solution designed specifically to support the DER revolution. It has the competitive advantage of being an end to end, all in one, failsafe solution. Additionally, the DERCOM tiered architecture places functionality where it is most effectively implemented. And the design provides a superior level of cyber security and communications flexibility, through its use of multiple media in secure combinations.

This tiered design allows phased DERCOM deployment, with benefits at each phase. For example, a single station D-DERM will support multiple E-DERMs that control DER spread across the station's circuits. That stand-alone D-DERM can employ a variety of targeted algorithms that maximize grid performance in the local service area. Later, a D-DERM/C-DERM connection can be added such that multiple D-DERMs provide broader coordinated regional benefits.

DERCOM is the outgrowth of an existing GridEdge Networks' Distributed Generation Permissive (DGP) system that uses a powerline conducted permissive signal to detect Unintentional Islanding (UI). The DGP method and system is explained in U.S. Pat. No. 9,733,632. This new architecture is optimized to provide a scalable and flexible communications network for DER integration.

When DERCOM is combined with DGP, it employs a UI permissive signaling method that is 100% dependable and is unaffected by disturbances on the transmission grid (unlike other UI methods).

This invention includes the implementation of a closed-loop control system based on the multi-tiered distributed DERCOM network. This closed-loop control system illustrates one, of potentially many, DERCOM applications. It compares circuit generation-to-load ratio in real time and makes local decisions at the substation and feeder level. It can prevent DER backfeed by issuing intelligent power curtailment commands, while enabling grid stability features such as Volt/VAR control, DER frequency regulation, and other grid support functions such as Virtual Power Plants (VPP). It can also be used for maximizing circuit hosting capacity and for improved distribution planning, which will aid DER developers and utility planners in making financial investments and long-term commitments.

Below is an example of a DER closed-loop control algorithm implemented in the D-DERM software (refer to FIG. 5).

1. Begin main control loop
2. For each station
   a. For each DER: Input to E-DERM the real time Generation (PGn: output power in Watts) and send reading to D-DERM
   b. Input to D-DERM, the real time power outflow from station (PS)
   c. Calculate in D-DERM the total Load (PS+PG1+PG2+ . . . )
   d. Compare Generation to Load (G/L) ratio to factor K (typically: K=0.77)
   e. If G/L is greater than K, proceed to curtail DER output power by 10%; otherwise go to step a
   f. D-DERM send power curtailment command to DER via E-DERM
   g. Wait T seconds (default value: T=1)
   h. Send configuration information request command to curtailed DER
   i. Verify that DER changed its maximum output power limit to 90% of previous value; if DER didn't change its value, trip the DER
   j. Enter new limit in local D-DERM data base
   k. Wait L seconds (default value: L=5)
   l. Go to step a.
3. End control loop Below is an implementation example of using a combined DERCOM-DGP system that provides unintentional islanding protection and uses one-way powerline communications in lieu of a two- way external channel. While less accurate than a two-way communications implementation, it provides a secure way to limit the G/L ratio, using nameplate generation data rather than actual real time generation.

For each DER on the station, the D-DERM shall:
a. Store all DER nameplate information in D-DERM database
b. Calculate approximate total station generation using DER nameplate information
c. Calculate approximate station load using DER nameplate information and real time station outflow readings
d. Calculate approximate station generation/load ratio (R) using results from b and c
e. Compare R to allowable limit K
f. Establish control link with DER
   i. Send a permissive signal when DER is allowed to export power
   ii. Stop the permissive signal when DER is not permitted to export power
   iii. Send a digitally encoded token to the E-DERM to enable sending a command to the DER
g. If R>K, send a digitally encoded token to the E-DERM to curtail output power by 10%
h. If station outflow does not immediately increase due to DER curtailment, D-DERM disconnects the DER from the grid by stopping the permissive signal
i. Enter new curtailed generation value into nameplate data base (zero if DER tripped in step h), replacing previous value
j. Go to b The use of the powerline conducted permissive signal guarantees the ability to curtail or disconnect the DER when there is loss of communications of the primary DERCOM channel. The permissive commands may be embedded within the DGP UI signal. The preceding two control algorithms are representative of a wide range of control applications that DERCOM will support and host. Other examples include circuit voltage profile optimization, circuit power factor optimization, and setting adaptive relays in real time.

BRIEF DESCRIPTION OF THE DRAWINGS

The accompanying drawings illustrate embodiments of the invention and, together with the general description given above, serve to explain the method and system for a Distributed Energy Resources Communications Network and Control System (DERCOM).

FIG. 1 depicts a section of the power grid with DER deployments on circuits emanating from the utility substation. There is no communication between the utility grid and DER. The DER simply connects or disconnects from the grid based on local connection conditions. There are no provisions for DER grid support functions.

FIG. 2 depicts the same section of the power grid with a DERCOM network providing direct communications and control between the utility (or another authorized agency) and DER. The DERCOM network uses D-DERM substation controllers (red boxes) and E-DERM edge devices at each DER location (blue boxes). The E-DERM may also interface with other utility devices. An optional C-DERM software resides at the utility control center. This C-DERM may optimize the operation of multiple D-DERM.

FIG. 3 depicts a field deployment of a basic DERCOM network between a distribution substation and a single DER. This configuration has a D-DERM controller located at the substation and an E-DERM edge device located at the point of common coupling of the DER. The communications between the D-DERM and the E-DERM is point-to-point and can use various secured wired and wireless media options. The D-DERM communicates to other devices inside the substation using DNP3 protocol and the E-DERM communicates to the DER over short wired or wireless hops using one of the three IEEE approved protocols. Future communications between D-DERM and C-DERM is supported.

FIG. 4 depicts a DERCOM-DGP network and its capabilities. DGP signaling over the power line provides 100% dependable UI protection as well as selected communications backup and related control signals. Primary D-DERM/E-DERM communications is conducted over external (wired or wireless) redundant channels. Upon loss of the external communications network, the system defaults to using the powerlines for basic functions such as fixed size power curtailment and permit service. Another embodiment uses the powerline signal to send commands and an external channel for feedback. This is a highly secure mode of operation.

FIG. 5 depicts an example of the implementation of a closed-loop control algorithm used for optimizing grid operation on every circuit in a region by changing DER settings and monitoring their effect in real time. This concept also supports the creation of virtual power plants (VPP). The same concept can also be extended to non-DER devices such as voltage regulators and capacitor banks, EV charging stations, and other loads. This represents a full three tier DERCOM configuration.

FIG. 6 depicts an implementation of a closed-loop control algorithm used for power control of DER to maintain a desired generation/load ratio. The software algorithm inside the D-DERM controller continuously receives Load and Generation inputs and makes DER output power decisions in real time. The control commands are sent from the D-DERM in the substation to the DER's via the E-DERM edge devices.

The E-DERM devices use secure communication channels to send back Generation readings from the DER PCC location (Point of Common Coupling). The DERCOM-DGP system uses the powerlines to send a permissive signal to protect against unintentional islanding. It also serves as a partial backup when the DERCOM primary communication channels are not available (as a highly secure one-way communications path). This can be thought of as an equivalent to a computer "safe mode".

BEST MODE FOR CARRYING OUT THE INVENTION

The present invention can be implemented in various different embodiments, such as (but not limited to) the embodiments described below:

First Embodiment

A method and system for a distributed communications and control network that manages Distributed Energy Resources (DER) on a power utility grid. Such network using a three-tiered network architecture (FIG. 2) named DERCOM comprised of two or three components:
  a. E-DERM—An edge DER module (required)
  b. D-DERM—A distributed DER module (required)
  c. C-DERM—A centralized DER module (optional)

The DERCOM network can begin as D-DERM/E-DERM installations (FIG. 3; FIG. 4) which can later integrate with an existing or future centralized C-DERM deployment.

The E-DERM module being an edge device, physically located at each DER Point of Common Coupling (PCC), providing communications and protocol translations between DER and utility grid over wired or wireless connections. The E-DERM may also be located at utility device (e.g. voltage regulator or capacitor bank) locations to control such devices. E-DERM communicates with D-DERM.

The D-DERM module being a distributed system controller, physically located at the utility substation and managing multiple DER sites via E-DERM devices, on a circuit and substation aggregate basis. A D-DERM hosts multiple algorithms providing various grid optimization applications. The D-DERM may also manage non-DER utility devices for distribution automation and demand response applications. D-DERM communicates with E-DERM and C-DERM.

The C-DERM module being a management software application typically located at a regional utility control center. The C-DERM communicates with one or many D-DERM substation controllers to implement broad overall control strategies.

DERCOM provides the four fundamental roles of a DERM system:
1. Aggregate: Aggregates the services of many individual DER and presents them as a smaller, more manageable, number of aggregated virtual resources
2. Simplify: Handles the granular details of DER settings and presents simple grid-related services
3. Optimize: Optimizes the utilization of DER within various groups to get the desired outcome at minimal cost and maximum power quality
4) Translate: Translates individual DER languages, and presents to the upstream calling entity in a cohesive way.

Second Embodiment

The DERCOM network and system in the first embodiment using redundant communication channels in various configurations for higher availability and enhanced security. Communication media include wired, wireless, and powerline communications (FIG. 3; FIG. 4).

E-DERM/D-DERM communications can take a variety of forms, including:
  Two way over an external communications link (e.g. fiber, wireless, cellular, other)

PLC for outgoing and external link for incoming
PLC for outgoing only (one-way implementation)
Two way over an external link (e.g. fiber, wireless, cellular) with PLC supervision
Combinations of the above The PLC signal may also be used to monitor circuit continuity, providing unintentional islanding (UI) protection as done by GridEdge DGP.

Third Embodiment

The DERCOM network and system in the first embodiment allowing for a scalable and cost-effective way to manage multiple DER on a utility network.

Fourth Embodiment

The DERCOM network and system in the first embodiment using IEEE 1547-2018 approved communications protocols and IEEE 1547.1-2020 DER commands

Fifth Embodiment

The DERCOM network and system in the fourth embodiment enabling DER grid support applications in compliance with IEEE 1547-2018.

Typical DER Grid Support Applications

Intelligent Volt-Watt Control
Reactive Power/Power Factor
Low Voltage Ride Through
Load and Generation Following
Storage Systems Charge/Discharge Management
Connect/Disconnect
Dynamic reactive Current Injection (responding to change in voltage)
Max Generation Limiting
Intelligent Frequency-Watt Control
Peak Limiting Function for Remote Points of Reference
DER Protection—Island Detection and Grid Disconnects; Steady State Operation in Islanded Mode
DER Load Balancing—Maintains L/G Ratio by Curtailing DER Output
3V0 protection—Avoids Backflow Through Transformer onto High Side
ESS Charging Control—Controls Charging Parameters of Energy Storage
ESS Frequency Regulation—Regulates Power Frequency
Many Others

Sixth Embodiment

A closed-loop control software algorithm that monitors and manages station generation/load ratio in real time and uses the DERCOM network and system in the first embodiment (FIG. 5). The closed-loop control software is implemented in the D-DERM substation controller.

Seventh Embodiment

An embodiment of the algorithm in the sixth embodiment that uses a DERCOM network (FIG. 6).
  Begin main control loop
  For each station
  a. For each DER: Input to E-DERM the real time Generation (PGn: output power in Watts) and send reading to D-DERM
  b. Input to D-DERM, the real time power outflow from station (PS)
  c. Calculate in D-DERM the total Load (PS+PG1+PG2+ . . . )
  d. Compare Generation to Load (G/L) ratio to factor K (typically: K=0.77)
  e. If G/L is greater than K, proceed to curtail DER output power by 10%; otherwise go to step a
  f. D-DERM send power curtailment command to DER via E-DERM
  g. Wait T seconds (default value: T=1)
  h. Send configuration information request command to curtailed DER
  i. Verify that DER changed its maximum output power limit to 90% of previous value; if DER didn't change its value, trip the DER
  j. Enter new limit in local D-DERM data base
  k. Wait L seconds (default value: L=5)
  l. Go to step a.
  End control loop

Eighth Embodiment

The closed-loop control system in sixth embodiment used to avoid substation transformer backfeed into the utility transmission system and expanded to optimize circuit hosting capacity, eliminate the need for substation 3V0 protection, provide adaptive relay settings and enable other grid support applications.

Ninth Embodiment

The DERCOM network and system in the first embodiment, used for Front of The Meter (FTM) and Behind the Meter (BTM) applications. E-DERM devices connect to FTM or BTM sources and loads which can then be managed. Connection may be via wired, wireless, powerline or other means.

Tenth Embodiment

The DERCOM network and system in the first embodiment integrated with a GridEdge Distributed Generation Permissive (DGP) system (FIG. 4). Commands sent via DGP are highly cyber-secure. DGP communications may take a variety of forms:
  PLC for outgoing and external link for incoming
  PLC for outgoing only (one-way implementation)
  Two way over an external link with PLC supervision

Eleventh Embodiment

The DERCOM-DGP network and system in the tenth embodiment providing unintentional islanding protection, along with multiple DER grid support applications, thereby providing an all-in-one solution to grid optimization,

Typical DER Grid Support Applications

Intelligent Volt-Watt Control
Reactive Power/Power Factor
Low Voltage Ride Through
Load and Generation Following
Storage Systems Charge/Discharge Management Connect/Disconnect Dynamic reactive Current Injection (responding to change in voltage)

Max Generation Limiting

Intelligent Frequency-Watt Control

Peak Limiting Function for Remote Points of Reference

DER Protection—Island Detection and Grid Disconnects; Steady State Operation in Islanded Mode DER Load Balancing—Maintains L/G Ratio by Curtailing DER Output 3V0 protection—Avoids Backflow Through Transformer onto High Side ESS Charging Control—Controls Charging Parameters of Energy Storage ESS Frequency Regulation—Regulates Power Frequency Many Others DER commands can be embedded within the UI permissive signal.

Twelfth Embodiment

The DERCOM-DGP network and system in the eleventh embodiment along with the closed-loop control software algorithm in the sixth embodiment (FIG. 5).

Thirteenth Embodiment

The DERCOM-DGP network and system in the eleventh embodiment along with the following control algorithm. This DERCOM-DGP system provides unintentional islanding protection and uses one-way powerline communications in lieu of a two-way external channel. While less accurate than a two-way communications implementation, it provides a conservative way to limit the G/L ratio, using nameplate generation data rather than actual real time generation.

For each DER on the station, the D-DERM shall:
a. Store all DER nameplate information in D-DERM database
b. Calculate approximate total station generation using sum of DER nameplate information
c. Calculate approximate station load using sum of DER nameplate information and real time station outflow readings
d. Calculate approximate station generation/load ratio (R) using results from b and c
e. Compare R to allowable limit K
f. Establish control link with DER
   i. Send a permissive signal when DER is allowed to export power
   ii. Stop the permissive signal when DER is not permitted to export power
   iii. Send a digitally encoded token to the E-DERM to enable sending a command to the DER
g. If R>K, send a digitally encoded token to the E-DERM to curtail output power by 10%
h. If station outflow does not immediately increase due to DER curtailment, D-DERM disconnects the DER from the grid by stopping the permissive signal
i. Enter new curtailed generation value into nameplate data base (zero if DER tripped in step h), replacing previous value
j. Go to b The permissive commands are embedded within the DGP UI signal.

Fourteenth Embodiment

The network and system in the first embodiment through the thirteenth embodiment providing compliance with, and utilization of, the IEEE 1547-2018 and IEEE 1547.1-2020 standards.

Fifteenth Embodiment

The network and system in the first embodiment through the fourteenth embodiment used for monitoring and managing non-DER utility assets for other applications such as distribution automation and demand response.

What is claimed is:

1. An integrated network and system for distributed communications and control of Distributed Energy Resources ("DER") on a power utility grid, using a hub and spoke, substation-centric network architecture, and comprising:
   a plurality of edge DER ("E-DERM") devices, each E-DERM device located at a DER point of interconnection;
   a single substation DER controller ("D-DERM") located at a utility substation and configured to manage the plurality of E-DERM devices;
   integrated point-to-point secured communications between the D-DERM and each of the plurality of E-DERM devices using dual-channel, redundant paths; and
   closed-loop control software algorithms running autonomously on the D-DERM at the utility substation to monitor and control DER connected to power lines emanating from the utility substation.

2. A network and system according to claim 1, wherein the closed-loop control software algorithms comprise a main control loop for each substation, including,
   a) for each DER, inputting to one of the plurality of E-DERM devices, real time generation (PGn: output power in Watts) and sending the input to the D-DERM;
   b) inputting to the D-DERM, real time power outflow from a station (PS);
   c) calculating in the D-DERM the total Load (PS+PG1+PG2+ . . . );
   d) comparing Generation to Load (G/L) ratio to factor K (K=0.77);
   e) if G/L is greater than K, proceeding to curtail DER output power by 10%, and if G/L is not greater than K, going to step a);
   f) sending from the D-DERM a power curtailment command to DER via one of the plurality of E-DERM devices;
   g) waiting T seconds, wherein T=1;
   h) sending a configuration information request command to curtailed DER;
   i) verifying that DER changed its maximum output power limit to 90% of previous value; and if DER didn't change its value, tripping the DER;
   j) entering new limit in a local D-DERM data base;
   k) waiting L seconds, wherein L=5;
   l) going to step a); and
   m) ending the control loop.

3. A network and system according to claim 1, the network and system being configured to manage multiple DER on a utility network where the single D-DERM controls the plurality of E-DERM devices and additional E-DERM devices can be added as needed per utility substation, and further comprising a distributed networked architecture as shown in FIG. 2 for adding further D-DERM controllers in new utility substations that can be installed incrementally.

4. A network and system according to claim 1, further comprising an uplink connection between the D-DERM in the utility substation and a centralized management system ("C-DERM") located in a utility control center over a SCADA connection, and wherein the D-DERM sends alarms and alert notifications to the C-DERM and receives DER commands from the C-DERM.

5. A network and system according to claim 1, configured to enable flexible interconnections of DER and dynamic grid support applications in DER smart inverter functions via direct point to point communications over dual channel private connections, as shown in FIG. 3, and wherein each closed loop control algorithm corresponds to a specific grid use case.

6. A network and system according to claim 1, wherein the closed-loop control software algorithms monitor and manage station generation/load ratio in real time as shown in FIG. 5; and wherein the closed-loop control software algorithms are implemented in a D-DERM substation controller.

7. A network and system according to claim 1, wherein the closed-loop control software algorithms are configured to: avoid substation transformer back-feed into a utility transmission system and expanded to optimize circuit hosting capacity and enable other grid support applications.

8. A network and system according to claim 1, the network and system being used for front of meter and behind the meter DER applications, wherein the plurality of E-DERM devices connect to sources and loads which can then be managed by the closed loop control software algorithms as shown in FIG. 5 directly or through aggregators.

9. A network and system according to claim 1, wherein the network and system is integrated with DER and non-DER utility assets for grid management applications and is running grid optimization closed loop control algorithms.

10. A network and system according to claim 1, wherein the closed-loop control software algorithms are configured to provide DER voltage and thermal control as follows:
 a) thermal issues only:
  current flow in thermally vulnerable elements is continuously monitored once per minute:
   when the flow in a monitored element is within 5% of its seasonal thermal limit, reduce by 10% a participating DER output to determine if the vulnerable element's current drops as a result,
   if no drop has resulted, the DER is not causing an overload,
    return DER output to previous level
   if drop has occurred, is the change sufficient (current flow down to 85% of maximum current rating),
    if yes, hold DER output at this value,
    if no, continue reducing DER output using 10% steps in one-minute intervals until element's current is acceptable or DER output is zero,
    when the element's current drops to 80% of seasonal rating, increase DER output until 90% of element rating is reached;
 b) overvoltage issues only:
  voltages at locations of concern are continuously monitored every 10 seconds:
   control action is initiated when voltages at locations of concern are within 1% of upper limits,
    for overvoltage at DER terminal, initiate Volt/Var control,
     if successful, proceed no further,
     if not, continue reducing DER output by 10% in 10 second intervals until voltage is acceptable or DER output is zero,
     when voltage is at rated value or below, increase DER output until voltage is within 2% of limit,
    for overvoltage remote from DER, reduce by 10% participating DER output to
     determine if the remote overvoltage drops as a result,
     if it has not dropped, return DER to previous output,
     if it has dropped, is the change sufficient,
      if yes, hold DER output at this value,
      if no, continue reducing DER output by 10% in 10 second intervals until remote voltage is acceptable or DER output is zero,
      when voltage is at rated value or below, increase DER output until voltage is within 2% of limit;
 c) thermal and overvoltage issues:
  voltage and current at sensitive locations are continuously monitored at 10 and 60 second intervals respectively:
   when the flow in a monitored element is within 5% of its seasonal thermal limit,
    reduce by 10% the participating DER output to determine if the vulnerable element's current drops as a result,
    if no drop has resulted, the DER is not causing the overload,
     return DER output to previous level,
    if it has dropped, is the change sufficient and are all monitored voltages acceptable,
     if yes, hold DER output at this value,
     if no, continue reducing DER output using 10% steps in one-minute intervals until element's current and all monitored voltages are acceptable or DER output is zero,
     when element's current drops to 80% of seasonal rating, increase DER output until 90% of element rating is reached,
   when voltages at locations of concern are within 1% of upper limit,
    for overvoltage at DER terminal, initiate Volt/Var control,
     if successful, proceed no further,
     if not, continue reducing DER output by 10% in 10 second intervals until remote voltage is acceptable or DER output is zero and no thermal issues are detected,
     when voltage is at rated value or below, increase DER output until voltage is within 2% of limit and no thermal issues are detected,
    for overvoltage remote from DER, reduce by 10% participating DER output to determine if the remote overvoltage drops as a result,
     if it has not dropped, return DER to previous output,
     if it has dropped, is the change sufficient,
      if yes, hold DER output at this value,
      if no, continue reducing DER output by 10% in 10 second intervals until remote voltage is acceptable or DER output is zero and no thermal issues are detected, when voltage drops to rated value, increase DER output until voltage is within 2% of limit and no thermal issues are detected.

11. An integrated network and system for distributed communications and control of Distributed Energy Resources ("DER") on a power utility grid, using a hub and spoke, substation-centric network architecture, with integrated point to point communications and comprising:
a plurality of edge DER ("E-DERM") devices, each E-DERM device located at a DER point of interconnection;
a single substation DER controller ("D-DERM") located at a utility substation and configured to manage the plurality of E-DERM devices;
integrated point-to-point secured communications between the D-DERM and each of the plurality of E-DERM devices using dual channel redundant paths;
closed-loop control software algorithms running autonomously on the D-DERM at the utility substation to monitor and control DER connected to power lines emanating from the utility substation; and
a Distributed Generation Permissive ("DGP") system using powerline conducted permissive signal technology as shown in FIG. 4, for sending DGP commands over a powerline.

12. A network and system according to claim 11, wherein the closed-loop control software algorithms comprise the following control algorithm shown in FIG. 6, wherein the integrated system provides unintentional islanding protection and uses one-way supervisory channel to limit generation to load (G/L) ratio, using nameplate generation data rather than actual real time generation, and wherein permissive commands are embedded within a DGP command, and where for each DER, the D-DERM is configured to:
a) storing all DER nameplate information in a D-DERM database;
b) calculating approximate total station generation using a sum of DER nameplate information;
c) calculating approximate station load using the sum of DER nameplate information and real time station outflow readings;
d) calculating approximate station generation/load ratio (R) using results from prior calculations;
e) comparing R to allowable limit K;
f) establishing control link with DER by
sending a permissive signal when DER is allowed to export power;
stopping the permissive signal when DER is not permitted to export power; and
sending a digitally encoded token to the E-DERM to enable sending a command to the DER;
g) if R>K, sending a digitally encoded token to an appropriate E-DERM device to curtail output power by 10%;
h) if station outflow does not immediately increase due to DER curtailment, disconnecting the DER from the grid by stopping the permissive signal;
i) if station outflow increases, entering new curtailed generation value into D-DERM data base, replacing previous value;
j) going back to the step of calculating approximate total station generation step b); and
k) ending control loop.

13. A network and system according to claim 11, wherein the closed-loop control software algorithms comprise the algorithm shown in FIG. 5, providing unintentional islanding protection, along with multiple DER grid support applications, thereby providing an all-in-one solution for grid optimization where DER commands are embedded within the DGP signal.

14. A network and system according to claim 11, wherein the closed-loop control software algorithms comprise a main control loop for each substation, including,
for each DER,
a) inputting to one of the plurality of E-DERM devices, real time DER generation (PGn: output power in Watts) and
b) sending the input to the D-DERM;
c) inputting to the D-DERM, real time power outflow from a station (PS);
d) calculating in the D-DERM the total Load (PS+PG1+ PG2+ . . . );
e) comparing Generation the Load (G/L) ratio to factor K (K=0.77);
f) if G/L is greater than K, proceeding to curtail DER output power by 10%, and if G/L is not greater thank K, returning to the prior inputting step a);
g) sending from the D-DERM a power curtailment command to DER via one of the plurality of E-DERM devices;
h) waiting T seconds, wherein T=1;
i) sending a configuration information request command to curtailed DER;
j) verifying that DER changed its maximum output power limit to 90% of previous value; and if DER didn't change its value, tripping the DER;
k) entering a new limit in a local D-DERM data base;
l) waiting L seconds, wherein L=5;
m) returning to the prior inputting step a); and
n) ending the control loop.

15. A network and system according to claim 11, the network and system being configured to manage multiple DER on a utility network where the single D-DERM controls the plurality of E-DERM devices and additional E-DERM devices can be added as needed per utility substation, and further comprising a distributed networked architecture as shown in FIG. 2 for adding further D-DERM controllers in new utility substations that can be installed incrementally.

16. A network and system according to claim 11, further comprising an uplink connection between the D-DERM in the utility substation and a centralized management system ("C-DERM") located in a utility control center over a SCADA connection, and wherein the D-DERM sends alarms and alert notifications to the C-DERM and receives DER commands from the C-DERM.

17. A network and system according to claim 11, configured to enable flexible interconnections of DER and dynamic grid support applications in DER smart inverter functions via direct point to point communications over dual channel connections, as shown in FIG. 3, and wherein each closed loop control algorithm corresponds to a specific grid use case.

18. A network and system according to claim 11, wherein the closed-loop control software algorithms are configured to avoid substation transformer back-feed into a utility transmission system and expanded to optimize circuit hosting capacity and enable other grid support applications.

19. A network and system according to claim 11, the network and system being used for front of meter and behind the meter DER applications, wherein the plurality of E-DERM devices connect to sources and loads which can then be managed by the closed loop control software algorithms as shown in FIG. 5 directly or through aggregators.

20. A network and system according to claim 11, wherein the network and system is integrated with DER and non-DER utility assets for grid management applications and running grid optimization closed loop control algorithms.

\* \* \* \* \*